April 3, 1934.   C. S. HASSELL   1,953,404
EGG CANDLING MACHINE
Filed Aug. 15, 1932   6 Sheets-Sheet 1
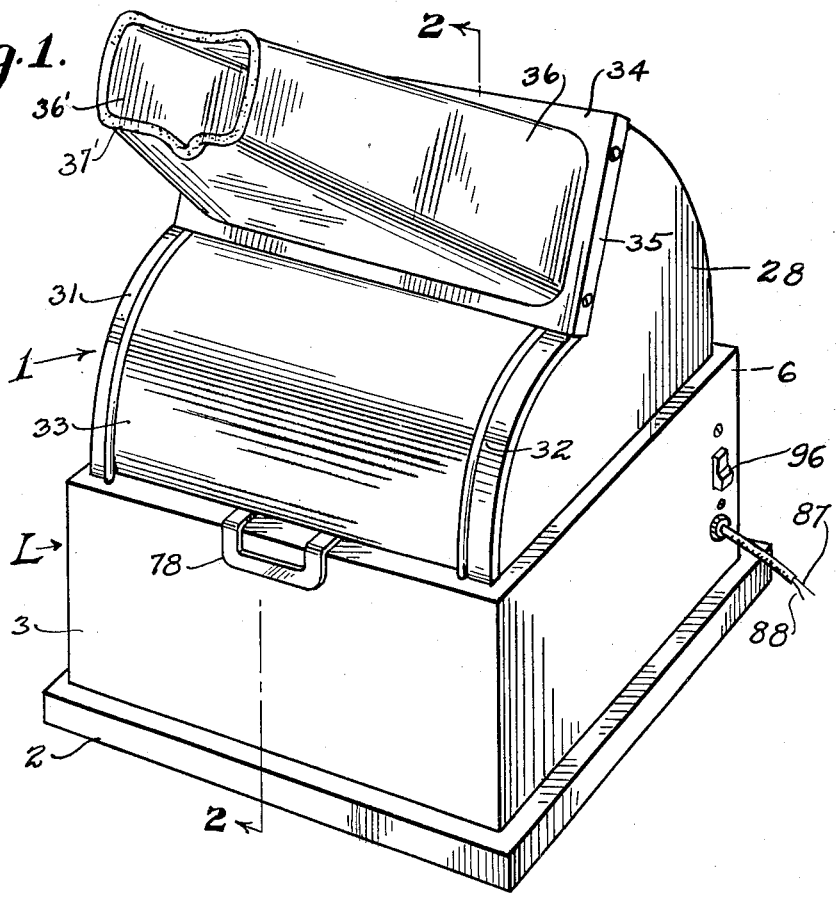
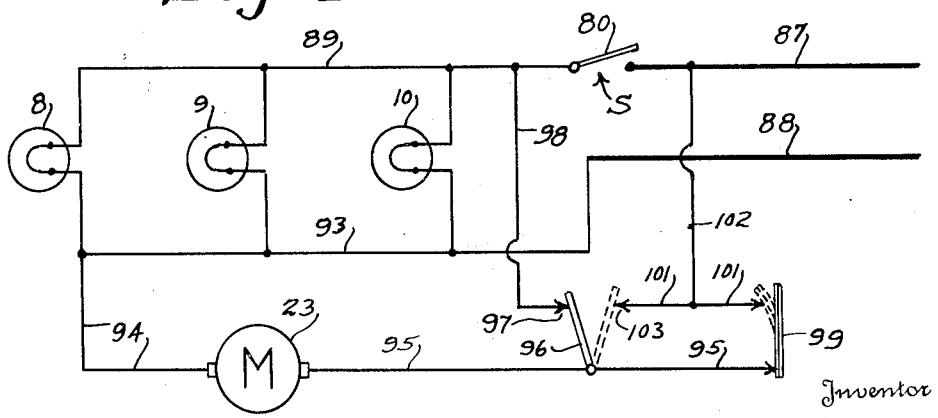
Cecil S. Hassell

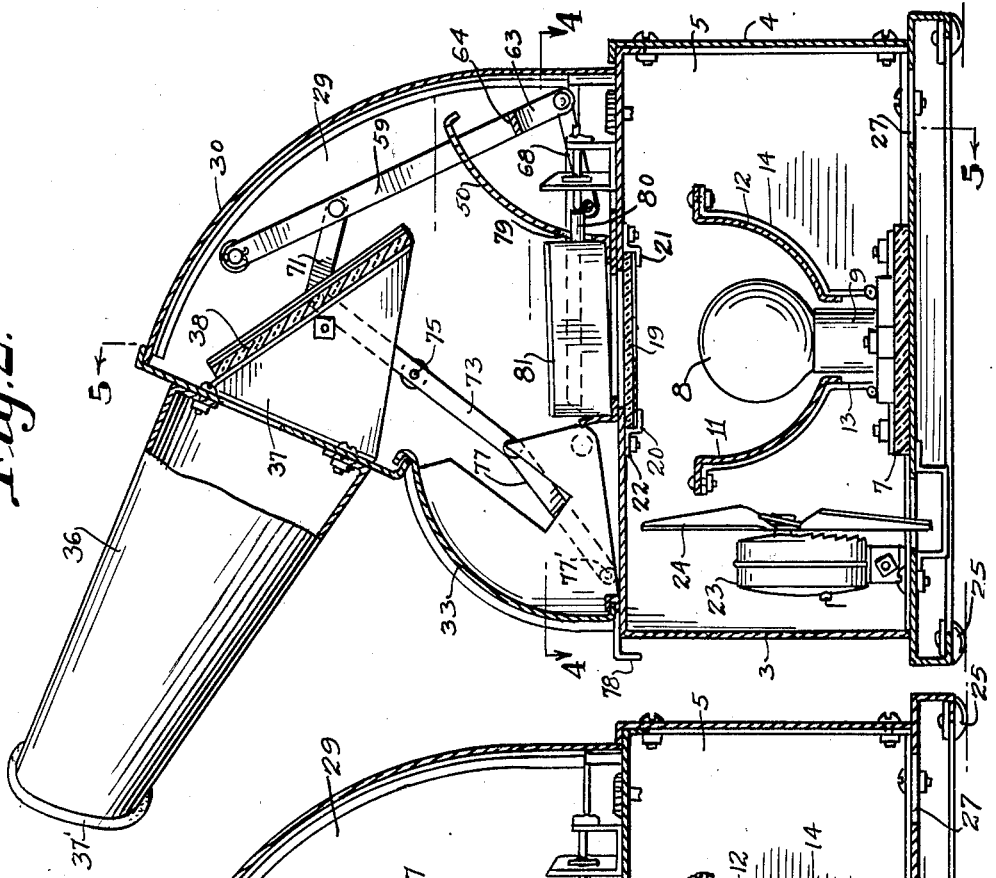

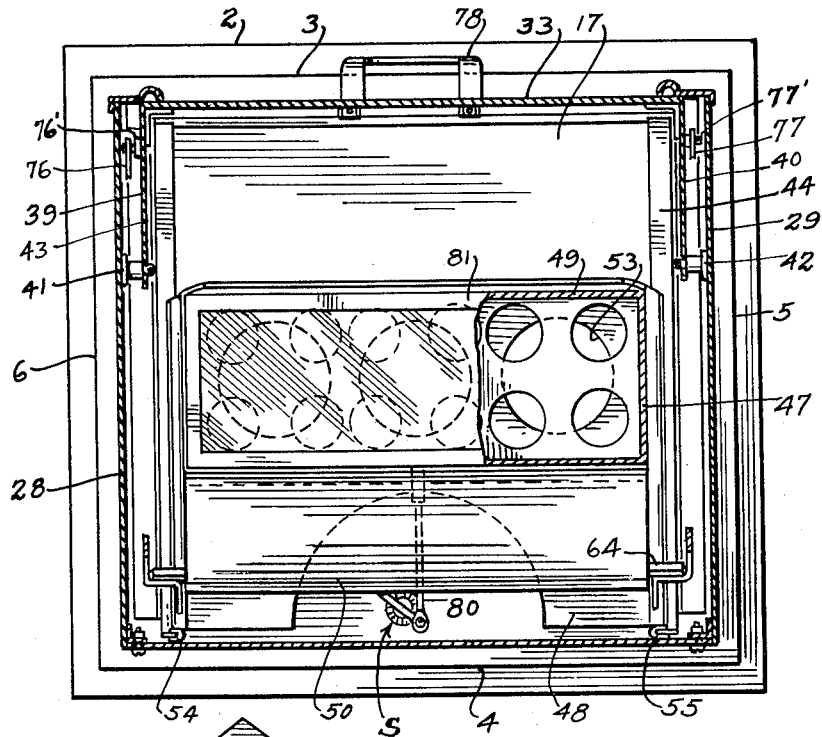
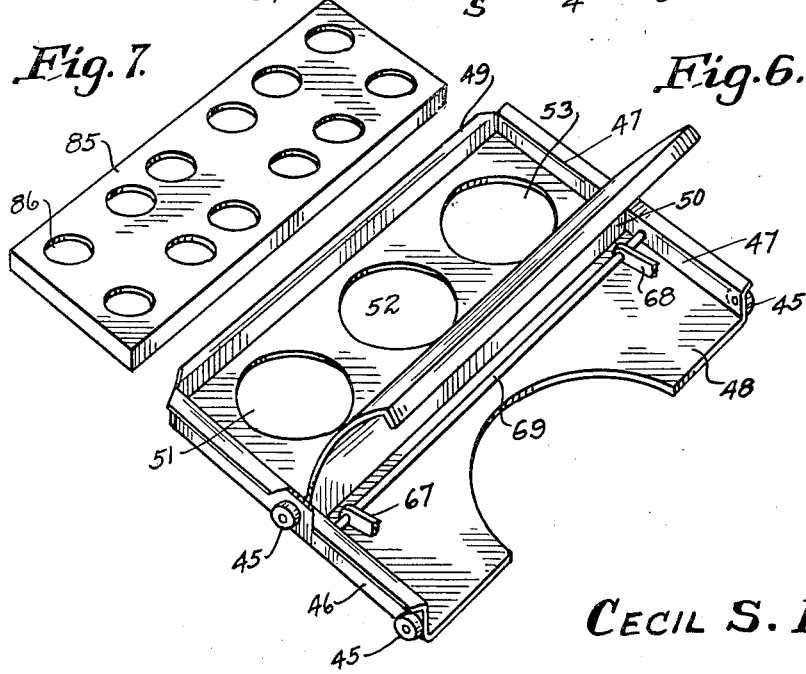

April 3, 1934.  C. S. HASSELL  1,953,404
EGG CANDLING MACHINE
Filed Aug. 15, 1932  6 Sheets-Sheet 4

Inventor
CECIL S. HASSELL
By Mason Fenwick Lawrence
Attorneys

April 3, 1934.  C. S. HASSELL  1,953,404
EGG CANDLING MACHINE
Filed Aug. 15, 1932   6 Sheets-Sheet 5

Inventor
CECIL S. HASSELL
By Mason Fenwick & Lawrence
Attorneys

April 3, 1934.  C. S. HASSELL  1,953,404
EGG CANDLING MACHINE
Filed Aug. 15, 1932   6 Sheets-Sheet 6
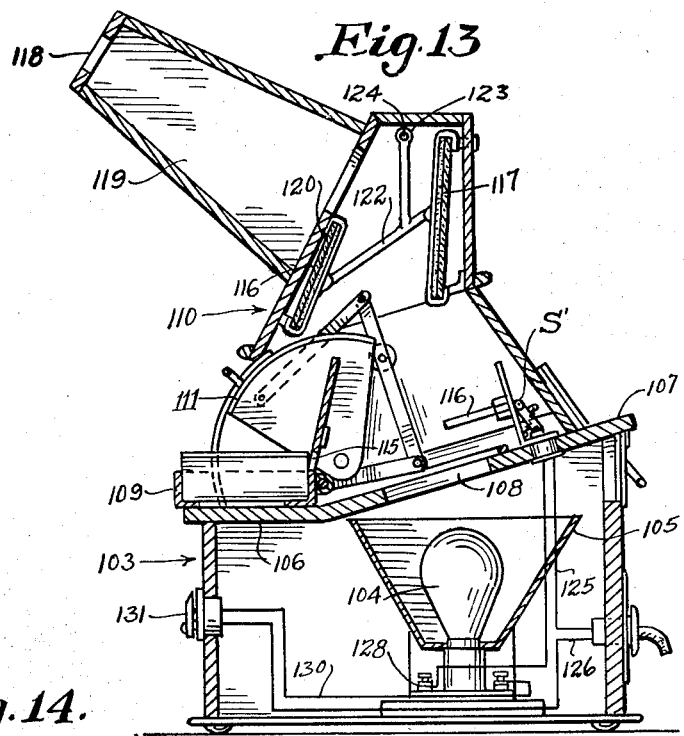
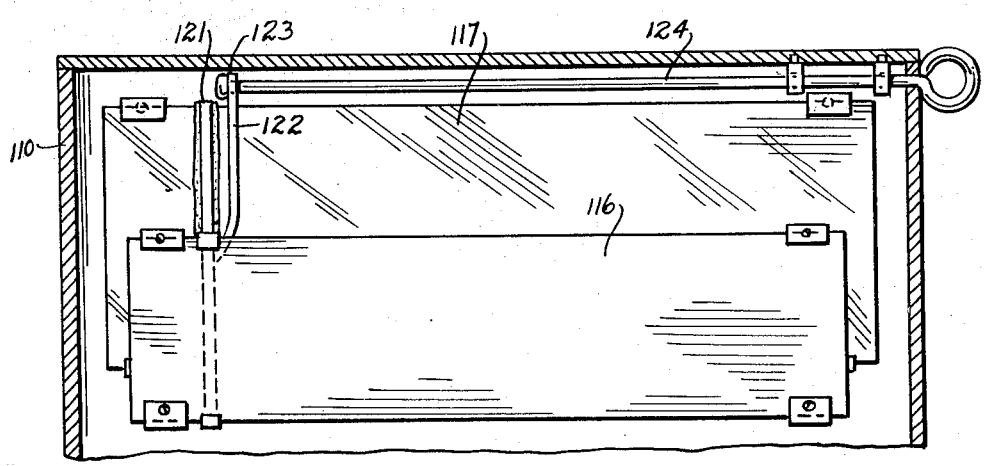
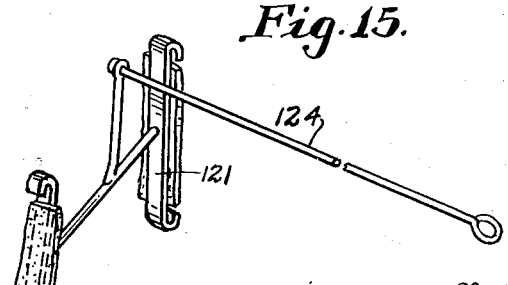
Inventor
CECIL S. HASSELL
By Mason Fenwick Lawrence
Attorneys Patented Apr. 3, 1934

1,953,404

UNITED STATES PATENT OFFICE 1,953,404

EGG CANDLING MACHINE

Cecil S. Hassell, Miami, Fla.

Application August 15, 1932, Serial No. 628,944

17 Claims. (Cl. 99—6)

The invention forming the subject matter of the present application is in the nature of a cabinet adapted to be positioned on counters of grocery stores or other stores for dispensing eggs and similar food stuffs. It is particularly intended to facilitate the candling of eggs by the purchasers of the same in order that they may see for themselves the quality of the eggs being purchased.

The main object of the invention is to provide a device of this nature by which the purchaser of eggs, preferably in cartons, may place the same in a drawer having a light transmitting bottom and forming part of the aforesaid cabinet and by the mere act of moving the drawer into the cabinet cause a candling light to be lit so as to shine through the eggs supported in the drawer and indicate to the purchaser, by suitable means forming part of the device, the condition of the eggs being subjected to inspection.

Another object of the invention is to provide an improved construction and arrangement of mirrors completely housed within the casing of the candler so as to occupy less space in the apparatus as a whole and to protect the mirrors.

A further object of the invention is to provide apparatus of this character with means arranged within the candler casing and accessible from outside the casing for cleaning the mirrors whenever desired.

Still another object of the invention involves the arrangement of the illuminating lamps below the light filter in such manner as to provide for ventilation of the illuminated chamber.

Another object of the invention is to provide apparatus of this character with means for regulating the intensity of the candling light in order to adapt the light for candling eggs of different color. For example, brown eggs require light of greater intensity than do white eggs for the candling operation. The present machine is, therefore, provided with means for varying the intensity of the candling lights in accordance with the color of the eggs to be candled.

A further object of the invention is to provide a positive means for removing heat from the device with control means by which same may be caused to operate manually or automatically.

Other objects of the invention will become apparent as the detailed description thereof proceeds.

In the drawings:

Figure 1 is a perspective view of the egg candling cabinet;

Figure 2 is a vertical transverse section taken on the line 2—2 of Figure 1;

Figure 3 is a similar section to Figure 2, with parts shown in a different position;

Figure 4 is a horizontal section taken on the line 4—4 of Figure 2;

Figure 6 is a perspective view of a carton carrier constituting part of the invention;

Figure 7 is a perspective view of an egg supporting tray adapted to be positioned in the aforesaid carrier;

Figure 12 is a wiring diagram;

Figure 13 is a transverse vertical section through a modified form of the invention;

Figure 14 is a fragmentary elevation to an enlarged scale of structure shown at the upper part of Figure 13; and Figure 15 is a perspective view of a mirror cleaning mechanism used in the modified form of the machine shown in Figure 13.

Figure 5:
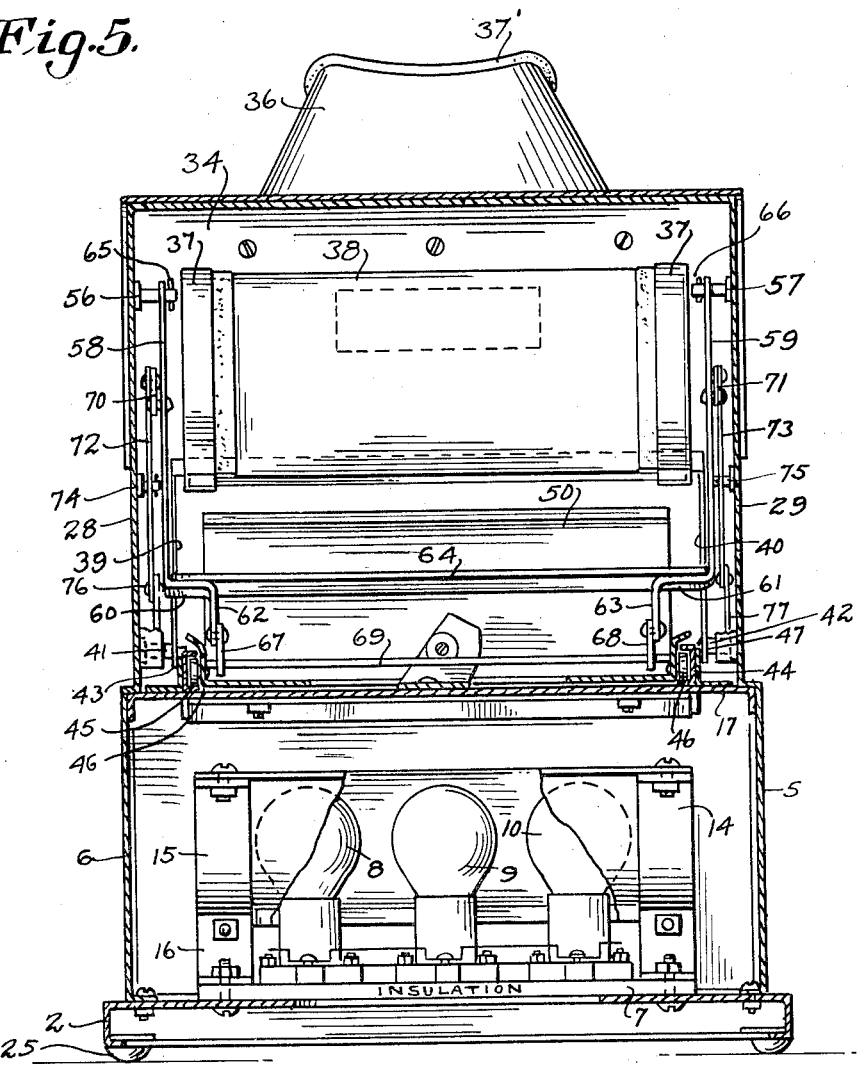
Figure 5 is a vertical section taken on the line 5—5 of Figure 2.

As shown in Figures 1 to 12 of the drawings, the preferred form of the invention comprises a cabinet designated generally by the reference numeral 1. This cabinet is preferably formed of sheet metal and comprises a base 2 forming a support for a light box structure L which comprises a front wall 3, a rear wall 4 and side walls 5 and 6 suitably secured to each other and to the base 2 to form a casing. A plate 7 of insulating material extends across the base 2 and is suitably secured thereto. Sockets for electric lamps 8, 9 and 10 are secured to the plate 7. Arcuate reflectors 11 and 12 are located on opposite sides of the lamps 8, 9 and 10 on standards 13—14, 15 and 16 secured to the insulated plate 7 and to the base 2.

Figure 10:
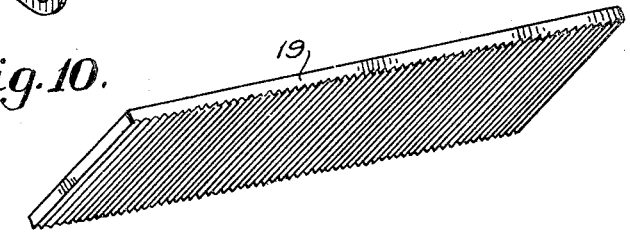
Figure 10 is a perspective view of a transparent light-diffusing member forming part of the invention.
Figure 11:
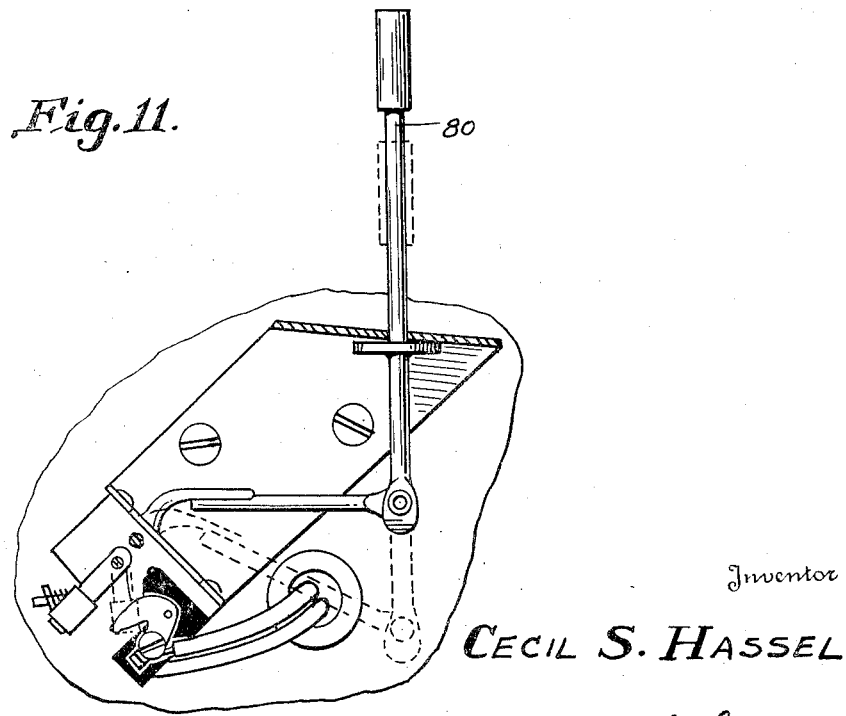
Figure 11 is a plan view of carton or tray operated switch forming a part of this invention.

Directly above the bank of lamps just described, the top 17 of the light box L is provided with a rectangular aperture 18 which is closed by a plate 19 of glass or similar transparent material. The plate 19 is ribbed on its under surface, as shown in Figure 10, for the purpose of diffusing light from the bank of lamps above referred to, and is detachably secured to the under side of the top 17 by means of Z-shaped channel brackets 20 and 21 which, in turn, are secured to the under side of the top 17 by suitable bolts 22.

For maintaining the temperature of the light box L below a predetermined limit, there is mounted in the aforesaid light box a motor 23 operating a fan 24. The base 2 is provided at its corners with resilient buttons 25 which raise the bottom of the base slightly above any surface on which the instrument may be supported. Apertures 26 and 27 are provided in the top of the base member 2, aperture 26 being adapted to receive the plates of the fan 24 during the rotation thereof and providing a means by which air may be drawn into the casing by the operation of the fan. Aperture 27 is arranged at the side of the bank of lamps opposite to that occupied by the motor 23 and the fan, and provides an exit for air set in motion across the lamps by the fan and drawn in through the aperture 26.

The candling structure proper is mounted on the top 17 of the light box L. This structure comprises a casing having end walls 28 and 29 which are shaped to provide a pleasing appearance for the structure as a whole. The rear edges of the end walls 28 and 29 are arcuately shaped and have suitably secured thereto the ends of a back wall 30 which may be removed to give access to the interior of the candling casing. The front edges of the end walls 28 and 29 have the lower parts thereof arcuately shaped to receive flange members 31 and 32 which form closures between the ends of an arcuate door 33 pivoted to swing about the center of the arc on which members 31 and 32 are struck.

The upper edges of the ends 28 and 29 are straight and are adapted to receive a flat plate 34 having flanges 35 (only one of which appears in the drawings) adapted to be detachably secured to the said ends 28 and 29. The plate 34 has a sight hood 36 suitably secured thereto. The sight hood 36 has its outer end shaped to fit the forehead and nose of a person performing the candling operation. This shape is adapted to position the eyes of the operator centrally of the opening 36' and this opening is rimmed with an edging 37' of any suitable soft material.

The inside face of the plate 34 has a pair of triangular brackets 37 fixed thereto, only one of which is shown in Figures 2 and 3 of the drawings. These brackets 37 support between them a mirror 38 arranged at a suitable angle relative to the light transmitting aperture 18 for projecting rays of light from the bank of lamps through the sight aperture 36' of the hood 36. The door 33 has its opposite ends secured to sector members 39 and 40. These members 39 and 40 are apertured to receive pivot pins 41 and 42 fixed to the end walls 28 and 29 of the cabinet at the center of the arc on which the door 33 and the members 31 and 32 are struck.

The top 17 of the light box (see Figure 5) has a pair of channel guides 43 and 44 suitably secured thereto. The channels of these guides 43 and 44 are shaped to receive rollers 45 pivotally mounted on the opposite upturned ends 46 and 47 of a carton or tray carrier 48 which is designed to slide between the said channel members toward and from the door 33. This carrier 48 is provided with an upturned front 49 and with a partition 50 extending transversely of the carrier between the end walls 46 and 47. The end walls 46 and 47 and the walls 49 and 50 are spaced apart so as to form a rectangular container adapted to receive snugly a tray or carton of standard size designed to receive a dozen eggs.

The carrier 48, between the walls 46, 47, 49 and 50 is provided with three large light transmitting openings 51, 52 and 53. The ends of the channel members 43 and 44 are provided with inturned stops 54 and 55 of resilient material adapted to contact with the ends of the walls 46 and 47 of the carrier so as to position the carrier with the apertures 51, 52 and 53 centrally of the light transmitting aperture 18 of the light box.

The door 33 and the carrier 48 are linked together so that when the carton carrier is in its innermost position against the stops 54 and 55, the door 33 is closed, and conversely. When the door is fully opened the carrier is moved outwardly along the top 17 of the light box into convenient position for the reception of a carton of eggs to be candled. This outward position is shown clearly in Figure 3 of the drawings.

To provide this cooperative movement between the door and carton carrier, a pair of pivot pins 56 and 57 (see Figure 5) are secured to the inside of the walls 28 and 29. These pivot pins 56 and 57 have pivotally secured thereto the upper ends of rods 58 and 59, respectively. The rods 58 and 59 adjacent their lower ends are bent inwardly to form flanges 60 and 61 which, in turn, are bent downwardly to form branches 62 and 63. A cross rod 64, suitably secured to the flanges 60 and 61 serves to hold these branches 62 and 63 at a fixed distance apart from each other. Cotter pins 65 and 66, passing through the pivot pins 56 and 57 hold the upper ends of the rods 58 and 59 properly located on the pivot pins.

The lower ends of the branches 62 and 63 have links 67 and 68 pivotally connected thereto, the other ends of these links 67 and 68 being pivoted to a cylindrical cross rod 69 extending between the walls 46 and 47 of the carton carrier. It will be obvious that if the rods 58 and 59 are swung about their pivots 56 and 57, their linkage connection with the cross rod 69 will cause the carton carrier 48 to slide inwardly and outwardly along the top of the light box.

In order to effect the automatic inward and outward movement of the carton carrier with the closing and opening of the door 33, the rods 58 and 59 are pivotally connected between their ends to one end of each of the links 70 and 71, respectively. The other ends of the links 70 and 71 are pivoted to levers 72 and 73, which, between their ends, are fulcrumed on pivot pins 74 and 75 suitably secured to the end walls 28 and 27, respectively. The lower ends of the levers 72 and 73 are pivotally connected to one end of links 76 and 77 which have their other ends pivoted to pins 76' and 77' secured to the sector shaped end walls 39 and 40 of the door 33 near the lower end of said door. The links and levers just described are so designed as to cause the carton carrier to move toward and from candling position over aperture 18 during the closing and opening of the door 33. The door 33 is provided at its lower end with a suitable handle 78.

The rear wall of the partition 50 of the carton carrier is extended upwardly to prevent operators from getting their hands back of the carton carrier. This rear wall 50 is provided with an aperture 79 which permits the passage therethrough of a push rod 80 forming part of a switch S controlling the lighting of the lamps in the light box. The details of this switch are indicated somewhat roughly in Figure 11 of the drawings and form no particular part of the present invention as any switch mechanism having the push rod 80 normally projected yieldingly through the aperture 79 in the carton carrier will serve the same purpose.

Figure 8:
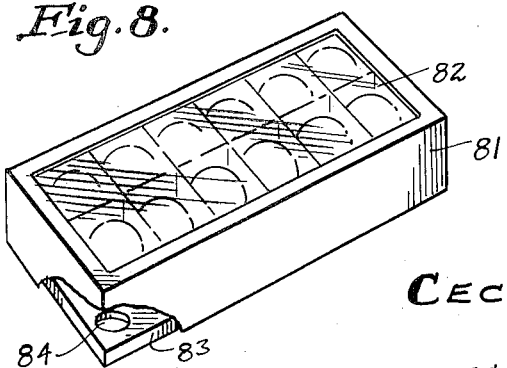
Figure 8 is a perspective view of a carton particularly designed for use in said carrier.
Figure 9:
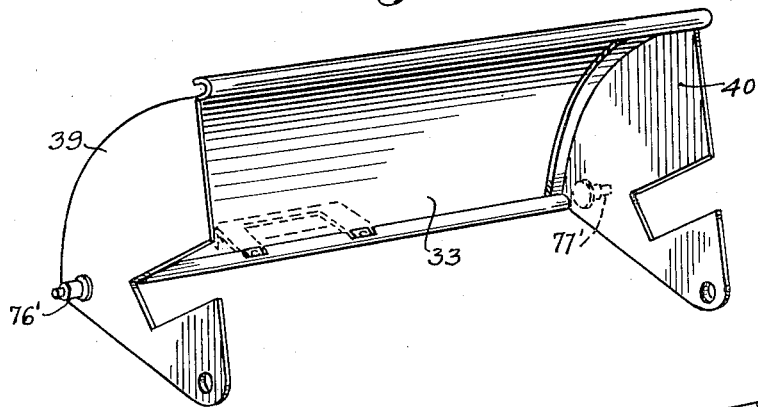
Figure 9 is a perspective view of a door forming part of the cabinet.

The carton carrier is designed to receive a carton of the type shown in Figure 8 of the drawings. This carton comprises a casing 81 having a transparent top 82. A tray 83 forms the bottom of the carton, and is provided with apertures 84 to support eggs thereon and through which light may be transmitted when the carrier with the carton thereon is properly positioned over the aperture 18. This particular and preferred form of egg carton is fully described and claimed in United States application, Serial No. 538,804, filed May 20, 1931.

The candling of eggs, however, may be effected without the use of any particular carton. In order to effect this operation, I have provided a tray 85 provided with twelve light transmitting openings, each of which is adapted to receive and support an egg. The tray fits snugly between the walls 46, 47, 49 and 50 of the carrier and the apertures 86 of the tray are so arranged that they are overlapped by the apertures 51, 52 and 53 in the bottom of the carrier, so that all the eggs positioned on said tray in the carrier may be illuminated simultaneously. The push rod 80 must be located at such height above the bottom of the carrier that it can be operated only by contact with the rear wall of the tray or carton positioned on the carrier.

The maintenance of this apparatus below a predetermined maximum temperature is one of the very important features of the invention. For this purpose (see Figure 12) the lamps 8, 9 and 10 are connected up with the motor 23 so that whenever the lamps are lit the motor 23 is also in operation. The mains 87 and 88 for supplying electrical energy to the lamps are provided with switches whereby the motor 23 may be operated independently of the lamps, and whereby it is always operated, regardless of whether or not the lamps are lit, when the temperature in the light box rises beyond a predetermined maximum.

The main 87 has the carton or tray operated switch S interposed therein; one end of the switch S being connected to the line 89 feeding in parallel across the three lamps 8, 9 and 10 to the line 93, connected to the return main 88. The line 93 is connected by line 94 to one terminal of the fan motor 23; the other terminal of which is connected by a line 95 to the pivot end of a single pole double throw switch 96 intended to be normally positioned in contact with the terminal 97 of a line 98 tapped to the line 89.

The line 95 continues beyond the pivot point of the switch 96 to be electrically connected to a thermostatic switch 99 of any suitable construction. As shown in the drawings, the switch 99 may consist of a bimetallic strip which bends toward a contact 100 as the temperature in the light box rises until at a predetermined temperature it completes contact with the said contact 100 on the end of a line 101 which is tapped by a line 102 to the main 87. The other end of the line 101 is provided with a contact terminal 103 adapted to be contacted by the switch 96 when manually thrown from the full line position to the dotted line position shown in Figure 12. The operation of this lighting and fan control mechanism will be obvious from inspection of Figure 12 of the drawings.

In the modification shown in Figures 13, 14 and 15, a light box 103' has a bank of lamps 104 (only one of which is shown) mounted therein and surrounded by a reflector hopper 105. The top of the light box includes a horizontal part 106 and and inclined part 107 provided with a light transmitting aperture 108 directly above the lamp 104.

A carton carrier 109, similar to that illustrated in Figures 2 and 3, is mounted on said top 106—107 to slide between the carton receiving position, shown in Figure 13, to a candling position against the stop 109' fixed on the top 107 to the rear of the aperture 108. The carrier is enclosed in the upper casing 110, which has an arcuate door 111 pivoted between opposite ends of the casing. This door is connected by a linkage system 112—113—114 to the carrier to move the carrier to and from candling position by the operation of closing and opening the door.

The carrier is provided with an aperture 115 in its rear wall to permit the push rod 116 of a light controlling switch S' to pass for operation by contact with the rear wall of a carton or tray positioned on the carrier 109.

Mirrors 116 and 117 are suitably mounted in the casing 110 to reflect rays of light from the lamps 104 through the sight aperture 118 of a hood 119 mounted on said casing 110. Wipers 120 and 121 for cleaning the mirrors 116 and 117 are mounted on the mirrors 116 and 117, and are connected by a frame 122 provided with a sleeve 123 fixed to a rod 124, designed to slide the wipers along the mirrors when desired.

Current for energizing the lamps 104 is fed into the light box through the mains 125 and 126. The main 125 is connected to one terminal of the carton operated switch S'. A wire 127 connects the other terminal of switch S' to contact 128 of lamp 104. The other lamp terminal 129 is connected by wire 130 to a rheostat switch 131, the return from which is effected by the main line 126. The rheostat switch is designed to vary the intensity of the candling light in accordance with variations in light transmissibility of the eggs being candled.

It is thought that the invention and numerous of its attendant advantages will be understood from the foregoing description and it is obvious that numerous changes may be made in the form, construction and arrangement of the several parts without departing from the spirit or scope of my invention or sacrificing any of its attendant advantages; the form herein described being a preferred embodiment for the purpose of illustrating my invention.

What I claim is:

1. An egg candler comprising an opaque plate provided with a light transmitting opening, a lamp supported below said opening, a carrier having light transmitting apertures therethrough and adapted to receive a support provided with apertures for supporting eggs in substantially fixed positions thereon, a switch controlling the lighting of said lamp, and means operated by positioning said carrier over said opening and by contact with said support to operate said switch.

2. An egg candler comprising an opaque plate provided with a light transmitting opening, a lamp supported below said opening, a carton carrier having a bottom provided with light transmitting apertures and adapted to receive means for supporting eggs in substantially fixed positions thereon, said carrier being slidable on said plate toward and from a fixed position over said opening, a switch on said plate to control the lighting of said lamp and operable by contact with said means when the carrier is in said fixed position to light said lamp.

3. An egg candler comprising an opaque plate provided with a light transmitting opening, a lamp supported below said opening, a carrier having a bottom provided with light transmitting apertures and adapted to receive means for supporting eggs in substantially fixed positions thereon, a stop on said plate, a switch controlling the lighting of said lamp, and operable by contact with said means when the carrier is positioned against said stop to operate said switch.

4. An egg candler comprising an opaque plate provided with a light transmitting opening, a lamp supported below said opening, a carrier having a bottom provided with light transmitting apertures and adapted to receive means for supporting eggs in substantially fixed position thereon, said carrier being slidable toward and from a predetermined position over said opening, means for sliding said carrier to and from said position, and a switch for said lamp operable by contact with said means only when the carrier is in said predetermined position.

5. An egg candler comprising a plate having a light transmitting opening, a light below said opening, an egg carrier slidable toward and from a position over said opening and having openings through the bottom thereof, a light excluding cover mounted on said plate over said opening, a door pivoted to said cover, and means connecting said door to said carrier to slide the carrier by the pivotal movements of said door.

6. An egg candler comprising a plate having a light transmitting opening, a light below said opening, a carrier slidable on said plate to and from a predetermined position over said opening, said carrier having a bottom provided with openings adapted to hold eggs in substantially fixed positions, a stop on said plate, a light excluding box mounted on said plate over said opening and carrier, a door pivoted to said box, and means connecting said door and carrier to move the carrier into and out of contact with said stop by the closing and opening, respectively, of said door.

7. An egg candler comprising a plate having a light transmitting opening therethrough, a light positioned adjacent said opening, a carrier slidable on said plate toward and from said opening, a light excluding box enclosing said carrier and opening, a door pivoted to said box, means connecting said door and carrier to move the carrier toward and from said opening upon operation of said door, said box having a sight opening, and means for reflecting light transmitted from said light through the light box.

8. An egg candler comprising a plate having a light transmitting opening therethrough, a light positioned adjacent said opening, a carton carrier slidable on said plate toward and from a predetermined position on said opening, a switch adjacent said opening and operable by contact with a carton on said carrier to control the operation of said light, a light box mounted on said plate and enclosing said carrier, opening and switch, said box having a door pivoted to the end walls thereof, a linkage connecting said door and carrier for moving the carrier upon operation of said door to cause operation of said switch when the carrier is moved to candling position over said opening.

9. An egg candler comprising a plate having a light transmitting opening, a lamp mounted below said opening, a reflector adjacent said lamp for reflecting the light thereof through said opening, a switch on said plate controlling the operation of said lamp, a stop on the plate adjacent said switch, a carton carrier movable into and out of contact with said stop, a light box mounted on said plate and enclosing said carrier, opening and switch, a door having sector shaped side walls and an arcuate front wall pivoted to swing through one wall of said box, and means connecting said door and carrier for moving the carrier into and out of contact with said stop and switch by the closing and opening operations of said door.

10. An egg candler comprising a plate having a light transmitting opening therethrough a lamp supported in fixed position below said opening, a carton carrier, a carton having a light transmitting bottom mounted on said carrier, means for moving said carrier toward and from said opening, and a switch on said plate adjacent one edge of said opening to control the operation of said lamp, said switch being operable by contact with a carton on said carrier when the latter is located in predetermined position over said opening.

11. An egg candler comprising a plate having a light transmitting opening therethrough, a lamp below said opening, a carton having light transmitting top and bottom walls, a light excluding hood enclosing said carton and opening, means operated by positioning said carton over said opening to control the lighting of said lamp, and means on said hood adjustable to reflect light transmitted from said lamp through said carton and hood in any desired direction.

12. An egg candler comprising a light excluding box having a light transmitting opening in one wall thereof, a source of light adjacent said opening, means for removing from said box heat produced by said source, mechanism operated by positioning an egg carrier to cover said opening to operate said means, and means automatically operable by heat above a predetermined temperature in said box for operating said heat removing means.

13. In combination, a light excluding box, a plate in said box having a light transmitting opening, an electric light below said opening, an electric fan within the box adapted to blow air against the electric light, switch means for controlling said light and fan, an egg carrier slidable toward and from a position over said opening and having openings through the bottom thereof, a door pivoted to said box, means operated by the door for sliding the egg carrier, and means operated by movement of the egg carrier to operate the switch means controlling the light and fan.

14. In combination a light excluding box, a plate in said box having a light transmitting opening, a source of light below said opening, positive means for removing heat produced by the source of light from the box, means controlling said heat removing means, an egg carrier slidable toward and from a position over said opening and having openings through the bottom thereof, a door pivoted to the box, and means operated by movement of the door for sliding the egg carrier.

15. In combination, a light excluding box, a light excluding plate in said box having a light transmitting opening, a source of light below said opening, positive means for removing heat produced by the source of light from the box, means for controlling said heat removing means, an egg carrier slidable toward and from a position over said opening and having openings through the bottom thereof, a door pivoted to the box, means operated by movement of the door for sliding the egg carrier and operating the means controlling the heat removing means.

16. In combination, a light excluding box, a plate in said box having a light transmitting opening, a source of light below said opening, positive means for removing heat produced by the source of light from the box, a thermostatic control device in said box for controlling said heat removing means, an egg carrier slidable toward and from a position over said opening and having openings through the bottom thereof, a door in the box and means operated by the door for sliding the egg carrier.

17. In combination a light excluding box, a plate in said box having a light transmitting opening, a source of light adjacent said opening, positive means for removing heat produced by the source of light from the box, an egg carrier slidable toward and from a position closing said opening and having openings through the bottom thereof, a door in the box, means operated by opening and closing the door for sliding the egg carrier, manually controlled means for operating the heat removing means, thermostatically controlled means in said box for operating the heat removing means, and means operated by the movement of the door for controlling the heat removing means.

CECIL S. HASSELL.